United States Patent
Tzoref et al.

(10) Patent No.: US 9,600,347 B2
(45) Date of Patent: Mar. 21, 2017

(54) VERIFYING SYNCHRONIZATION COVERAGE IN LOGIC CODE

(75) Inventors: Rachel Tzoref, Haifa (IL); Eitan Daniel Farchi, Pardes Hana (IL); Ehud Trainin, Michmanim (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 1734 days.

(21) Appl. No.: 12/626,654

(22) Filed: Nov. 26, 2009

(65) Prior Publication Data

US 2011/0126173 A1 May 26, 2011

(51) Int. Cl.
G06F 9/46 (2006.01)
G06F 9/52 (2006.01)
G06F 11/36 (2006.01)

(52) U.S. Cl.
CPC ............ *G06F 9/52* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 7,284,194 B2 * | 10/2007 | Gupta | ................. | G06F 11/3664 707/999.01 |
| 7,627,785 B1 * | 12/2009 | Grodnik et al. | ........... | 714/38.14 |
| 2004/0230961 A1 * | 11/2004 | Biberstein | ........... | G06F 11/3624 717/150 |
| 2006/0167950 A1 * | 7/2006 | Vertes | ................. | G06F 11/3476 |
| 2009/0106741 A1 * | 4/2009 | Dageville et al. | ............ | 717/128 |

OTHER PUBLICATIONS

Lu, S.; Park, S.; Seo, E. & Zhou, Y. Learning from mistakes: a comprehensive study on real world concurrency bug characteristics SIGPLAN Notices, ACM, 2008, 43, 329-339.
P. Joshi, C.-S. Park, K. Sen, and M. Naik, "A Randomized Dynamic Program Analysis Technique for Detecting Real Deadlocks," in Proc. ACM SIGPLAN Conference on Programming Language Design and Implementation (PLDI'09), 2009, pp. 110-120.
Sherman et al., "Saturation-based Testing of Concurrent Programs", ESEC/FSE '09, Proceedings of the the 7th joint meeting of the European Software Engineering Conference and the ACM SIGSOFT Symposium on the foundations of software engineering, Aug. 24-28, 2009, Amsterdam, The Netherlands, pp. 53-62.

* cited by examiner

Primary Examiner — Gregory A Kessler
(74) Attorney, Agent, or Firm — Robert J. Shatto (57) ABSTRACT

A computer implemented system and method for measuring synchronization coverage for one or more concurrently executed threads is provided. The method comprises updating an identifier of a first thread to comprise an operation identifier associated with a first operation, in response to determining that the first thread has performed the first operation; associating the identifier of the first thread with one or more resources accessed by the first thread; and generating a synchronization coverage model by generating a relational data structure of said one or more resources, wherein a resource is associated with at least the identifier of the first thread and an identifier of a second thread identifier, such that the second thread waits for the first thread before accessing said resource.

4 Claims, 5 Drawing Sheets

VERIFYING SYNCHRONIZATION COVERAGE IN LOGIC CODE

TECHNICAL FIELD

The claimed subject matter relates generally to testing logic code written for execution on computing systems and, more particularly, to verifying synchronization coverage in logic code executed in a multiprocessing environment.

BACKGROUND

Testing logic code written for execution on a computing system is a critical step in detecting and exposing potential errors during software development. Most existing techniques mainly focus on testing the sequential execution aspects. Such techniques cannot effectively address potential errors in a section of logic code that is written for concurrent execution of multiple processes.

The currently available testing schemes that do focus on the concurrent execution aspects of a logic code or program are, at times, inefficient. For example, such tests are limited to identifying a process based on process ID, process type, or the process's origination address. Such schemes can be used to identify different instances of a process spawned by a code block.

Typically, said tests fail to take into account the execution history of a process with respect to the resources accessed by the process. Moreover, the results obtained from several test runs or different instances of a process cannot be properly correlated for each run or instance. Thus, processes that originate from the same code location, during the same or different test runs, may not be distinguishable from one another.

SUMMARY

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a computer implemented method for measuring synchronization coverage for one or more concurrently executed threads is provided. The method comprises updating an identifier of a first thread to comprise an operation identifier associated with a first operation, in response to determining that the first thread has performed the first operation. The identifier of the first thread is associated with one or more resources accessed by the first thread. A synchronization coverage model is provided by generating a relational data structure of said one or more resources. In one embodiment, a resource is associated with at least the identifier of the first thread and an identifier of a second thread identifier, such that the second thread waits for the first thread before accessing said resource.

In accordance with another embodiment, a system comprising one or more logic units is provided. The one or more logic units are configured to perform the functions and operations associated with the above-disclosed methods. In accordance with yet another embodiment, a computer program product comprising a computer readable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
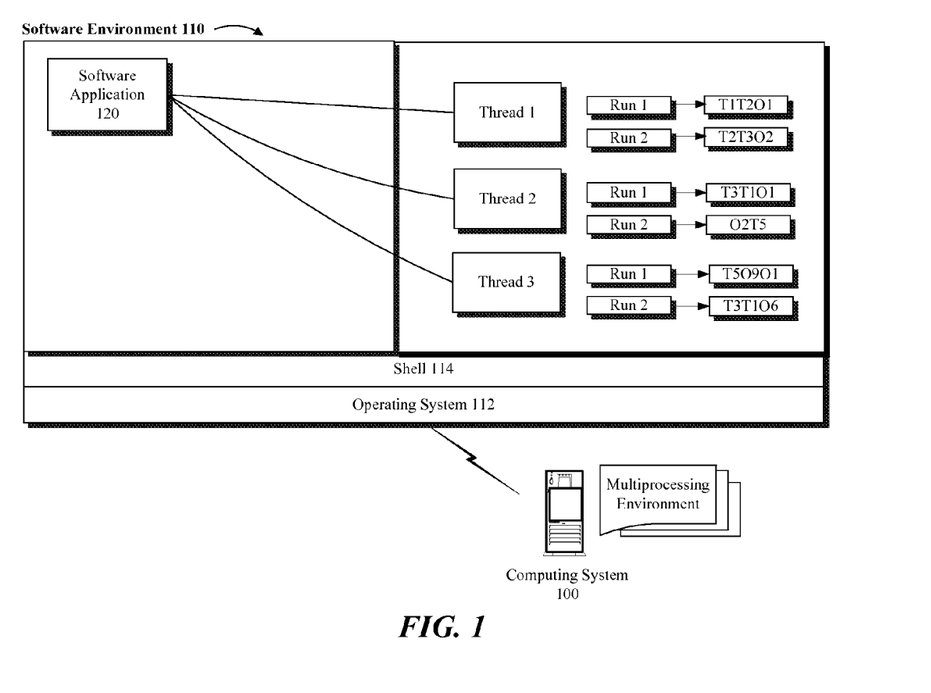
FIG. 1 illustrates an exemplary software environment for testing synchronization coverage for a logic code, in accordance with one or more embodiments.

Referring to FIG. 1, an exemplary runtime environment illustrated as software environment 110 is provided. Software environment 110 comprises an operating system 112 having a shell 114 loaded onto a computing system 100. In one embodiment, software environment 110 supports a multiprocessing environment in which a software application 120 may be executed on top of operating system 112 for the purpose of testing a logic code (not shown) for synchronization coverage.

Multiprocessing, also commonly referred to multithreading, refers to the parallel execution of multiple processes or threads. A thread represents a process that is originated from a section of a logic code that is executed. In a multiprocessing environment, different sections of the logic code may try to access a common resource, resulting in a potential access conflict and ultimately a deadlock. Synchronization mechanisms generally referred to as "locks" can be implemented to avoid such conflicts.

Software application 120 may be configured to execute a plurality of test runs to determine conflicts and deadlocks in a logic code under test. The logic code under test may be an executable code, software application, program code, or any other logic routine or system in which one or more locks may be taken on one or more resources in a multiprocessing environment. A resource may be a data file, data structure, an object with a certain utility, an input or output device, or any other form of resource that may be commonly shared and accessed in a computing environment.

Figure 2:
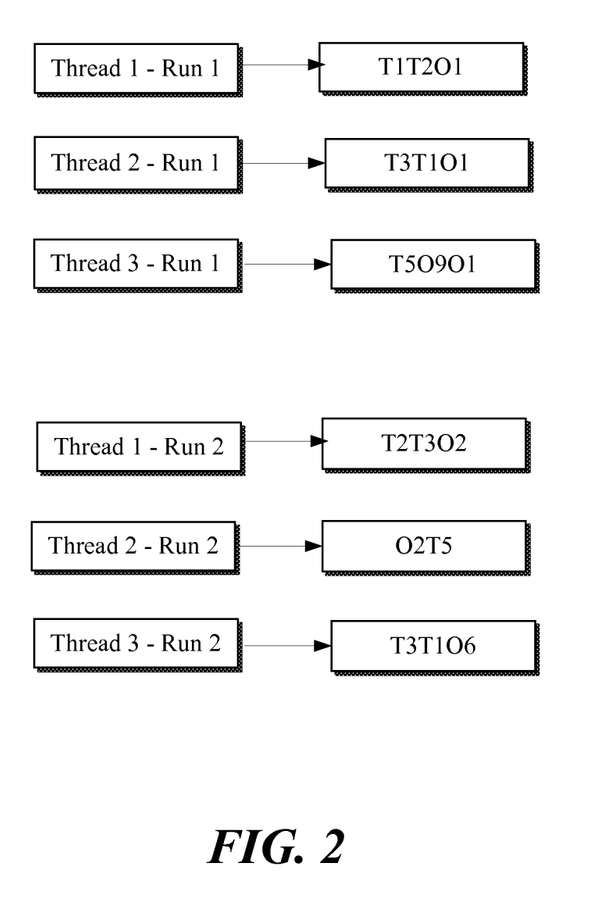
FIG. 2 is a block diagram of a series of test runs as identified by traces that include references to resources accessed by a thread during each run, in accordance with one embodiment.

Referring to FIGS. 1 and 2, several test runs may be used to identify deadlock potentials among different threads and to produce a trace of execution for each thread. As shown in FIG. 1, for example, threads 1, 2 and 3 may be executed concurrently. During the first execution (i.e., the first run) thread 1 may lookup values in table 1 (T1) and table 2 (T2) prior to accessing a first object (O1), for example. In one implementation, a thread may be identified by a history of the resources accessed by that thread. In the above example, thread 1 may thus be identified by the trace 'T1T2O1'.

Accordingly, different threads (e.g., thread 2, thread 3, etc.) may be identified by way of the history of the resources accessed. As further examples, threads 2 and 3, during the first run may be identified respectively by traces 'T3T1O1' and 'T5O9O1'. The former trace indicates that thread 2 respectively accessed tables 3 and 1 prior to accessing object 1, and the latter trace indicates that thread 3 accessed table 5 prior to accessing objects 9 and 1, respectively. During different test runs, a thread may access different resources than a previous run. Using the above identification methodology, the same thread may be functionally distinguishable during different runs. As shown in FIG. 1, for example, thread 3 is identified by different traces 'T5O9O5' and 'T3T1O6' for test runs 1 and 2, respectively.

Depending on implementation, the length of a trace for a thread may be N units long, where each unit identifies a resource accessed by the thread. In the exemplary embodiments illustrated in FIG. 2, N is equal to 3, for example, where each trace identifies three resources. It is possible for the length of the traces for different runs (or different threads) to be set differently, depending on implementation or emphasis on a certain thread or run. For example, in one implementation, N for thread 1 may be set to 4, and N for thread 2 may be set to 2. In such an example thread 1 may be identified by 'T1T2O1O2', and thread 2 may be identified by 'T3T1' during the first run, where thread 1 accesses object 2 after accessing the object 1.

Once the traces from several runs and for one or more threads are generated, the result may be provided to a human operator or a computing system (e.g., an analysis platform) to evaluate any potential conflicts or deadlocks. Referring to the above exemplary traces for threads 1 and 2, during the first run, a potential conflict is identified if thread 1 holds a lock on T1 while waiting to access O1, after thread 2 has placed a lock on T3 and O1 while waiting to access T1. A deadlock may result if thread 1 continues to wait for thread 2 to release O1 before thread 1 releases T1, and thread 2 continues to wait for thread 1 to release T1 before thread 2 releases O1

In some embodiments, each test run is separately executed, therefore the relationship between the locks taken during each run may not be reflected, even if the locks across different runs are associated with the same code location or have the same runtime identity. According to one implementation, software application 120 is configured to identify and trace the runtime identity associated with one or more resources or locks during each run. Runtime identity (hereafter "runtime ID") of a resource or lock uniquely identifies the resource or lock and is desirably determined based on the runtime ID of an object associated with the resource or the lock. The runtime ID may also indicate the location in the runtime environment (e.g., memory address) where the respective object resides.

In alternative embodiments, a trace may include identifiers that point to the location in the logic code where a thread has entered or exited a function. That is, the trace may include identifiers that indicate that the thread has called or is returning from a function at a certain location in the code. In certain embodiments, the trace may identify a thread by identifying that an object was instantiated or released at a certain code location by the thread. Such information is helpful to determine whether two threads that access a common resource from different execution paths, accessed the resource in different orders.

Consider an exemplary test run in which a first thread is identified by a first trace, and a second thread is identified by a second trace. Both threads may access and hold a lock on a common resource R during different execution paths for a program code under test. It would be desirable to determine whether the two threads waited for one another to release a lock on R. If the test results indicate that, for example, the first thread waited for the second thread but there is no test results indicating that the second thread waited for the first thread, there is likely a deficiency in synchronization coverage. In other words, since a test result that covers both waiting scenarios for each thread would be the expected norm, if one scenario is not reflected, that deficiency may be an indication of a weakness in the test that should be corrected.

In one embodiment, a trace may be constructed from N last entries on a call stack associated with a corresponding thread, desirably, at the time the thread is accessing an identifiable resource. A call stack is a data structure that stores information about the active functions called (or objects instantiated) by a thread. A call stack keeps track of the point in the logic code to which each active function should return control when the function finishes executing, or identifies instances of objects that are active at a time during the life span of an object. The active functions are those which have been called but have not yet completed execution, and the active objects are those that have been instantiated but not yet released (e.g., deinstantiated).

It is noteworthy that the above defined methods can be used either alone or in combination to identify one or more threads spawned by a logic code under test. Such methods may be utilized either individually or in association with different thread attributes to help analyze, detect and expose potential conflicts and deadlocks in, for example, a multithreaded logic code. In certain embodiments, a software application 120 may be implemented to produce a functional coverage model for the logic code under test based on one or more of the above defined methods.

Figure 3:
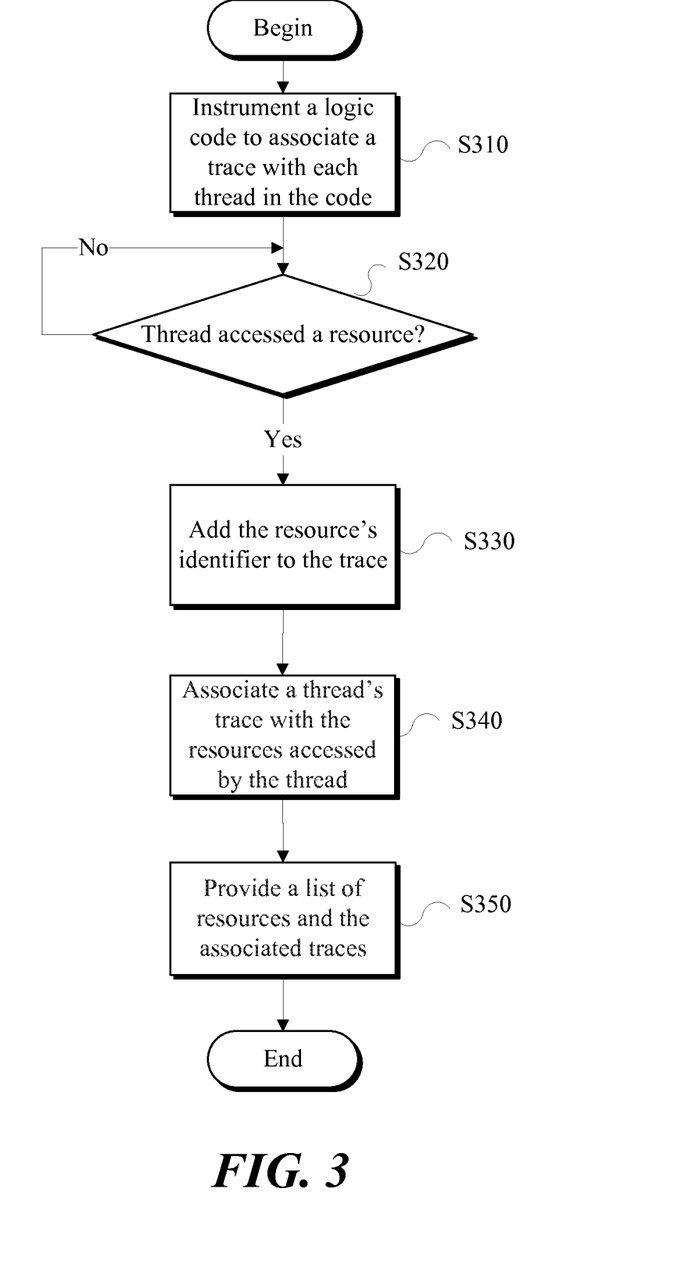
FIG. 3 is a flow diagram of a method for testing synchronization coverage for a logic code, in accordance with one embodiment.

In the following, an exemplary algorithm is provided that may be utilized to implement software application 120 to generate a functional coverage model. Referring to FIG. 3, in one embodiment, a logic code under test may be instrumented so as to associate a trace with one or more threads in the logic code (S310). Instrumentation within this context refers to placing instructions in selected sections of the logic code under test to generate an output or report that provides the values assigned to certain variables or objects of interest, as the logic code is executed. The generated values are used to determine code coverage and potential conflicts.

When a thread accesses a resource, the thread places a lock on the resource to avoid other threads from accessing it at the same time. If it is determined that a thread has accessed a resource, the resource's identifier is added to a trace associated with that resource (S320, S330). A resource's identifier ('resource ID) may include an object name associated with that resource, the program location where the object was instantiated, or the address in memory pointing to the object. In certain embodiments, in addition to the resource identifier the respective operation (e.g., read, write, etc.) requested by the thread to be performed on the resource is also identified. For example, if a first thread reads resource A and then writes to resource B, and a second thread writes to resource A and then reads from resource B, the first and second threads may be associated with two unique resource IDs. For example, the resource ID for the first thread may be represented by the sequence (A, read), (B, write) and the resource ID for the second thread may be represented by (A, write), (B, read).

A thread may be identified by a trace which includes a list of the N last resources that it accessed, desirably in the access order. N may be an adjustable parameter and may be set according to the level of detail that is desired for analyzing a logic code or a particular thread. If the trace also includes information about the type of operations performed on each resource, as noted above, a more detailed analysis of the synchronization coverage for the thread is possible. In the above example in which the first and the second threads are identified by the two sequences "(A, read), (B, write)" and "(A, write), (B, read)" the two threads would be considered semantically equal if the read and write operations were not identified. Having the benefit of the operation information in the trace, provides one with the ability to determine whether each of the threads waited for the other during a test, for example.

In one embodiment, a thread's trace is associated with the resources accessed by the thread (S340). In the example above, resource B may be associated with a list of threads (as identified by traces) that accessed resource B. The list may include the entries "(A read, B write)" and "(A write, B read)", for example. Accordingly, each resource will have a history list including entries that indicate that the resource was accessed, or locked by certain threads, during a certain run.

After executing the logic code multiple times, desirably utilizing tools and methods that enhance the coverage of the test, a list of resources and the associated traces that identify the different threads during different test runs are provided (S350). In an exemplary embodiment, the result of the test runs may be provided in the form of a spreadsheet in which the resources are listed under a first column, for example, and the corresponding threads that accessed each resource are listed in the subsequent columns as identified by their trace history. In alternative embodiments, an eXtensible Markup Language (XML) file or other presentation tool or data structure may be utilized to generate the same or similar results.

The generated results may allow a human operator or alternatively a machine or a computing tool to select particular resources and traces that may be deemed problematic or of interest. In certain embodiments, traces may be transformed or refined by way of, for example, truncation to eliminate resources that are of less interest or to eliminate resources that are associated with traces that are deemed too long and complex to be meaningful for the purpose of further analysis.

A functional coverage model may be constructed based on the generated results or the refined truncated results, depending on implementation. An exemplary functional model may be configured according to one or more of the following attributes: (1) attributes Trace1 and Trace2 have as possible values the trace values that were recorded at the resources of interest, (2) attribute Resource has as possible values the resources of interest. In one example, resources R, S, and T may be accessed with the following traces recorded for each one of them:

R: abc, abd, xyz
S: abc, bgh, klm, xyz
T: agf, mnb, abc

If the test is to be configured to focus on synchronization coverage for R and S, for example, then the values of attributes Trace1 and Trace2 would be {abc, abd, xyz, bgh, klm}, and the value of Resource would be {R, S}.

In accordance with another embodiment, a coverage task for any two threads (e.g., as respectively represented by traces Trace1, Trace2) that have placed a lock on a common resource (e.g., a common trace element Resource), may be represented by <Trace1, Trace2, Resource>. Such coverage task would indicate that a first thread represented by Trace1 may block a second thread represented by Trace2, if both threads access the same Resource at the same time.

Referring to the earlier example, <abc, abd, R> and <abc, xyz, S> may be designated coverage tasks, but <abc, klm, R> may not be designated as a coverage task, because the thread represented by the trace "klm" was not recorded as accessing resource R. As a result, there may be no need to determine whether thread abc blocked thread klm from accessing the resource R.

In one embodiment, a human operator may select the resources and traces. Using the above mode, the coverage tasks would be relatively easy to review and analyzed by the human operator who has selected the traces. Additional restrictions and conditions may be also introduced for the purpose of further analysis of code coverage and lock synchronization.

Advantageously, using the above approaches, the point at which a thread accesses a resource may be determined, once a thread is identified by a trace. Further, due to the inclusion of the history of the thread in the trace, the resources that a thread has previously accessed are easily identified. Accordingly, particular threads (e.g., threads of interest) may be selected for further analysis and other threads (e.g., threads of less interest) or traces that are too complex may be ignored.

As noted earlier, in alternative implementations, a thread may be identified by a trace that identifies items on the call stack for that thread. Such alternative implementation may be utilized in addition or instead of the earlier discussed method in which a thread is identified by a trace of resources accessed or locked by that thread. A similar approach such as that illustrated in FIG. 3 may be applied to either implementation to determine synchronization coverage in a concurrent logic code.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
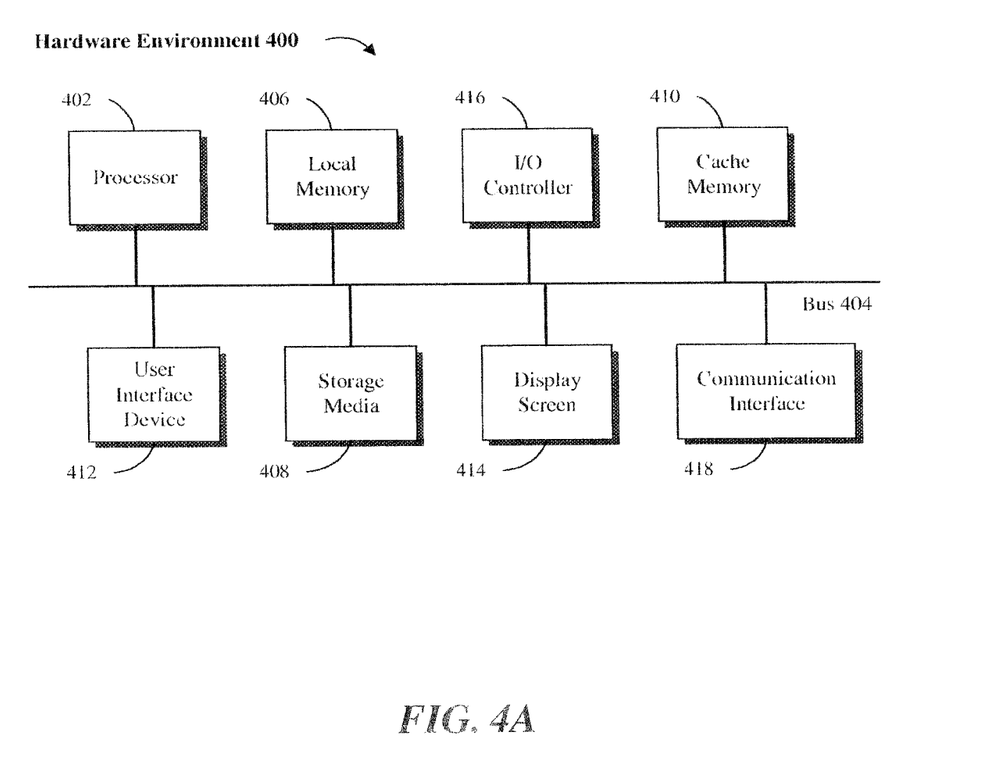
FIGS. 4A and 4B are block diagrams of hardware and software environments in which a system of the present invention may operate, in accordance with one or more embodiments.
Figure 4B:
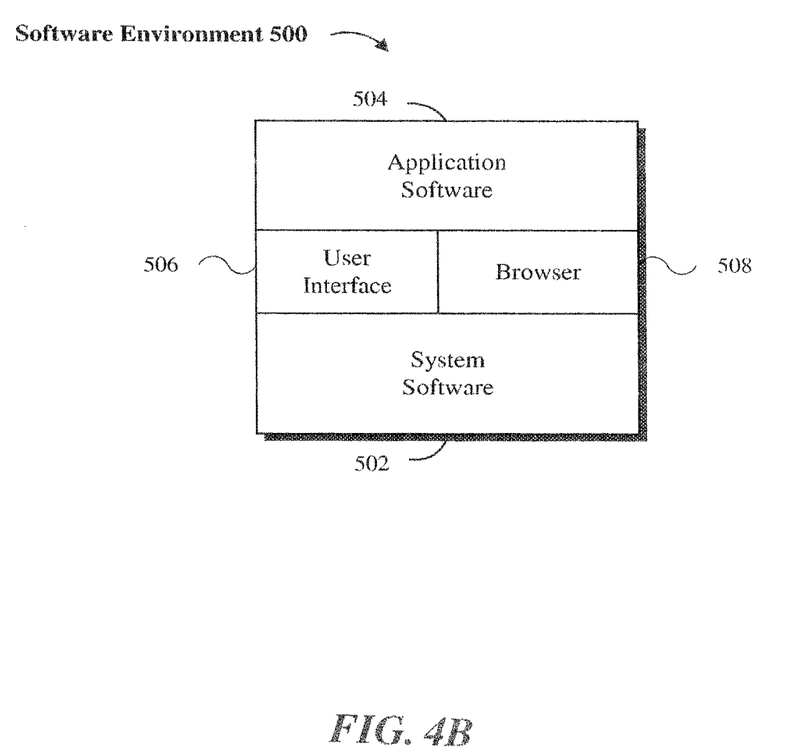

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer useable or computer readable media. Within the context of this disclosure, a computer useable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer useable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. An embodiment combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable storage medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer program product, comprising a computer-readable storage medium having logic code stored thereon, wherein the logic code, when executed on a computer, causes the computer to:
   execute a logic code under test on at least two runs;
   for each of the at least two runs, update an identifier of a first thread to comprise an operation identifier associated with a first operation, in response to determining that the first thread has performed the first operation, wherein the first thread is for the logic code under test;

for each of the at least two runs, associate the identifier of the first thread with one or more resources accessed by the first thread during a first execution path;

for each of the at least two runs, update an identifier of a second thread to comprise an operation identifier associated with a second operation, in response to determining that the second thread has performed the second operation, wherein the second thread is for the logic code under test;

for each of the at least two runs, associate the identifier of the second thread with one or more resources accessed by the second thread during a second execution path, wherein the second execution path is different from the first execution path: and generate a synchronization coverage model by generating a relational data structure of said one or more resources;

and, wherein:

for at least the second of the at least two test runs, at least one of the first thread and the second thread accesses different resources than on a previous run;

a common resource is associated with at least the identifier of the first thread and an identifier of the second thread indicating that the common resource was accessed by both the first thread and the second thread during the first execution path and the second execution path;

a synchronization event in execution of the first thread and the second thread holding a lock on the common resource is recorded, when an analysis of the synchronization coverage model indicates that the second thread waited for the first thread before accessing said resource, but that the first thread did not wait for the second thread before accessing the common resource; and     the computer-readable storage medium is not a transitory, propagating signal per se.

2. The computer program product of claim 1, wherein:

the identifier of the first thread comprises N units;

each unit comprises an identifier associated with an operation performed by the first thread; and each time the identifier of the first thread is updated, the length of the identifier of the first thread is incremented by one unit.

3. The computer program product of claim 2, wherein:

if the current number of units exceeds X, the oldest unit is removed, wherein X>N.

4. The computer program product of claim 3, wherein:

N is a number utilized to adjust level of detail with which history of operations performed by the first thread is compiled.

* * * * *